United States Patent
Cannon

(10) Patent No.: US 10,974,663 B2
(45) Date of Patent: Apr. 13, 2021

(54) TRIM PART

(71) Applicant: International Automotive Components Group GmbH, Duesseldorf (DE)

(72) Inventor: Carter Scott Cannon, Munich (DE)

(73) Assignee: International Automotive Components Group GmbH, Duesseldorf (DE)

( * ) Notice: Subject to any disclaimer, the term of this patent is extended or adjusted under 35 U.S.C. 154(b) by 356 days.

(21) Appl. No.: 16/170,531

(22) Filed: Oct. 25, 2018

(65) Prior Publication Data

US 2019/0126853 A1    May 2, 2019

(30) Foreign Application Priority Data

Oct. 26, 2017    (DE) .................... 10 2017 125 106.5

(51) Int. Cl.
```
B60R 13/02      (2006.01)
B60Q 3/54       (2017.01)
H05B 3/86       (2006.01)
B60Q 3/74       (2017.01)
H05B 3/20       (2006.01)
```
(52) U.S. Cl.
CPC ................ B60R 13/02 (2013.01); B60Q 3/54 (2017.02); B60Q 3/74 (2017.02); H05B 3/20 (2013.01); H05B 3/86 (2013.01); *B60R 2013/0287* (2013.01)

(58) Field of Classification Search
CPC ... B60R 13/02; B60R 2013/0287; B60Q 3/54; B60Q 3/74; H05B 3/20
USPC ................................................ 296/191, 1.08
See application file for complete search history.

(56) References Cited

U.S. PATENT DOCUMENTS

| | | |
|---|---|---|
| 8,377,347 B2 | 2/2013 | Sostmann et al. |
| 10,059,259 B2 | 8/2018 | Cannon et al. |
| 2010/0176110 A1* | 7/2010 | Ogino .................. B60H 1/2226 219/202 |
| 2012/0217232 A1* | 8/2012 | Hermann ................ B60R 13/02 219/202 |
| 2012/0234819 A1* | 9/2012 | Berger ..................... H05B 3/28 219/213 |

(Continued)

FOREIGN PATENT DOCUMENTS

| | | |
|---|---|---|
| CN | 109703481 | 5/2019 |
| DE | 10 2008 045 015 A1 | 3/2008 |
| DE | 102013214548 A1 | 1/2015 |

(Continued)

OTHER PUBLICATIONS

European Patent Office, European Search Report relating to corresponding application No. EP18200850, dated Jan. 29, 2019.

*Primary Examiner* — Joseph D. Pape
(74) *Attorney, Agent, or Firm* — Steven J. Grossman; Grossman Tucker Perreault & Pfleger, PLCC

(57) ABSTRACT

The disclosure provides a part of a vehicle, which includes a translucent cover layer having a front surface and a back surface; a heating layer comprising a translucent and opaque heating element extending in a plane of the heating layer, the heating layer located on the back surface side of the cover layer; and a lighting module associated with the heating layer and adapted for lighting the heating layer so that at least part of the heating layer is visible at the front surface side of the cover layer.

20 Claims, 16 Drawing Sheets

(56) References Cited

U.S. PATENT DOCUMENTS

2014/0211498 A1 7/2014 Cannon et al.
2016/0059670 A1 3/2016 Satzger et al.

FOREIGN PATENT DOCUMENTS

| DE | 102015004204 A1 | 8/2015 |
| DE | 10 2014 006 567 B4 | 4/2016 |
| DE | 102015200272 A1 | 7/2016 |
| DE | 102015220253 A1 | 4/2017 |
| EP | 2 762 362 A1 | 8/2014 |
| EP | 2762362 | 8/2014 |
| EP | 3476685 | 5/2019 |

* cited by examiner

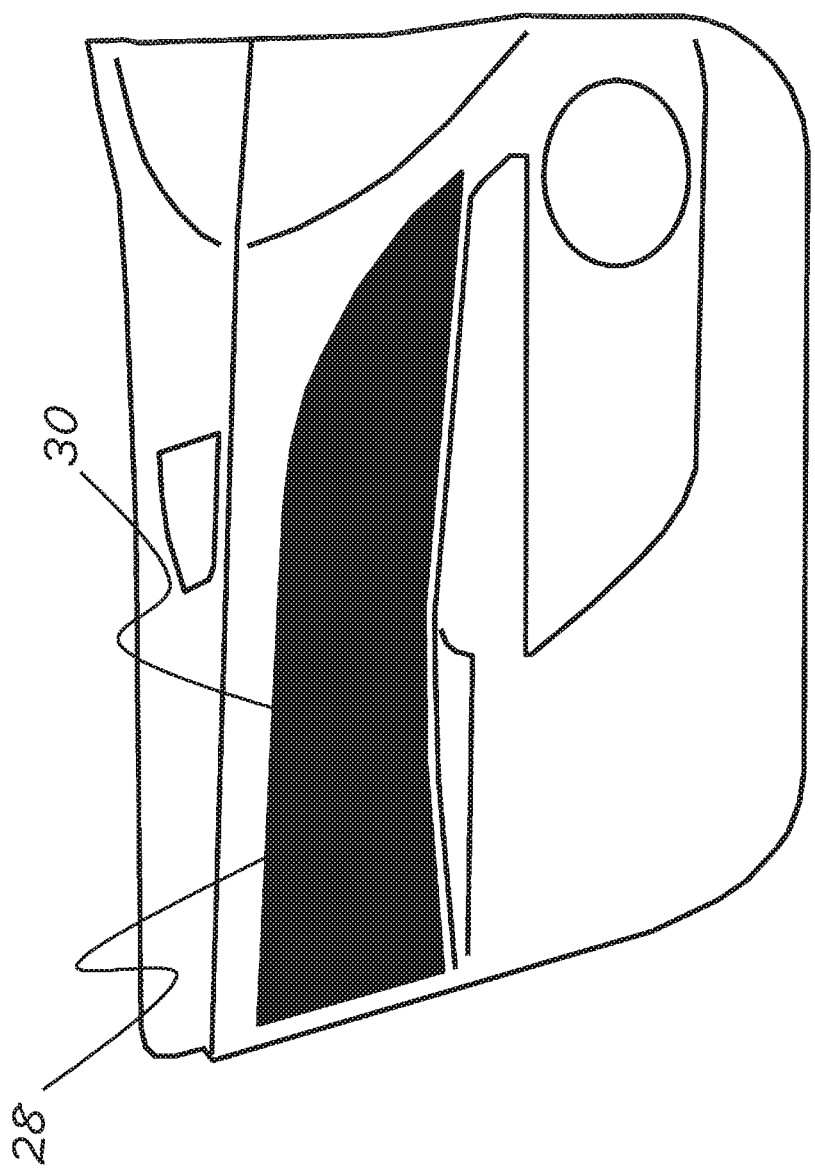
Fig. 2.A

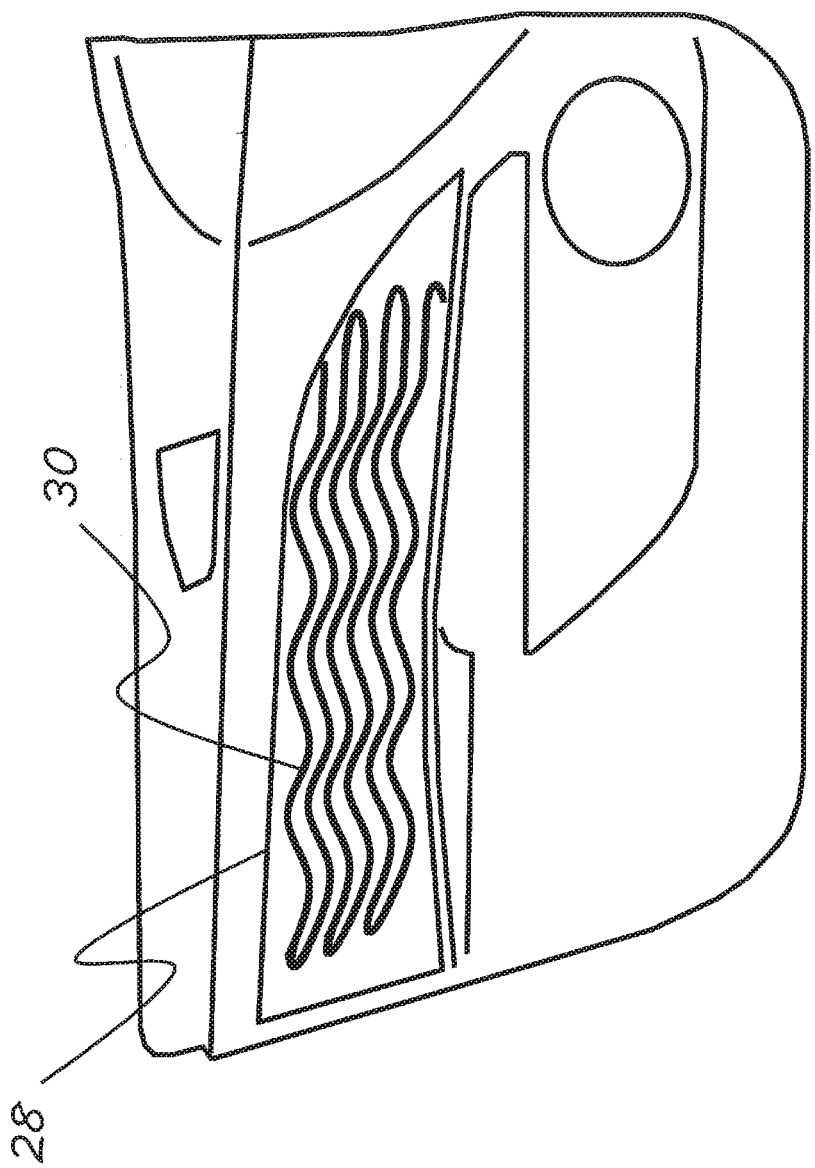
Fig. 2.B

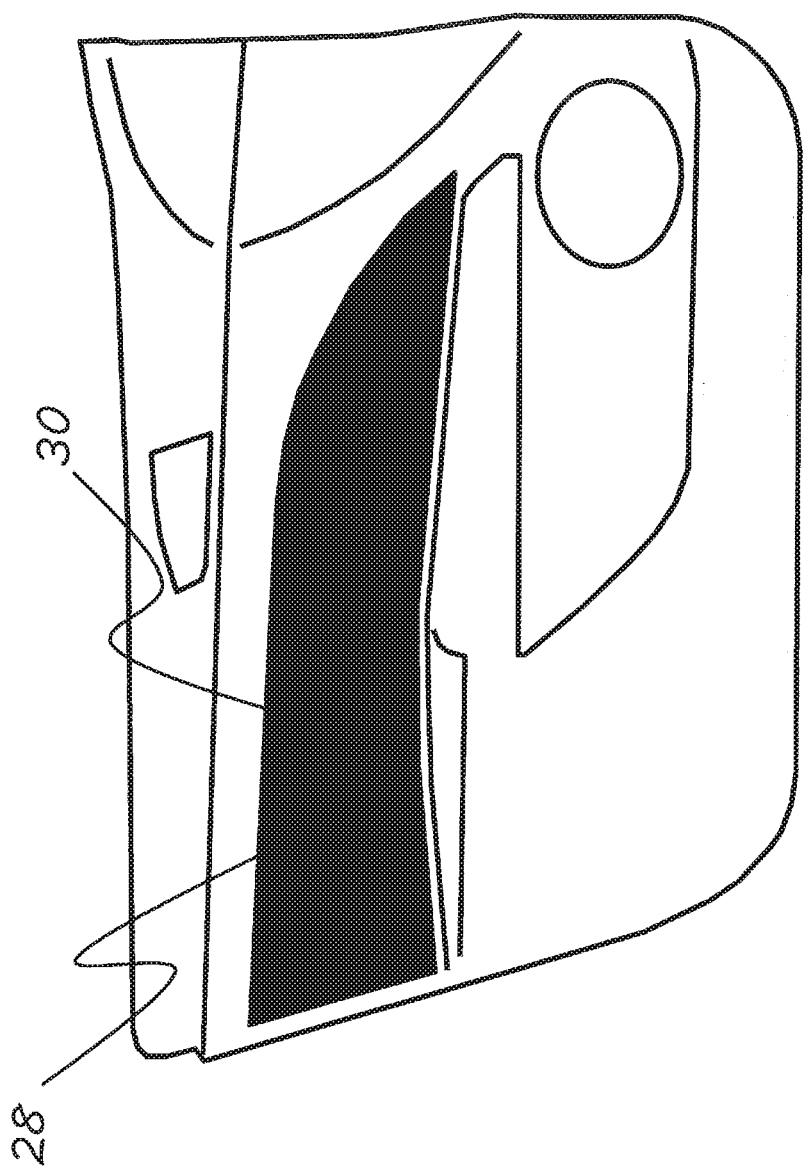
Fig. 2.c

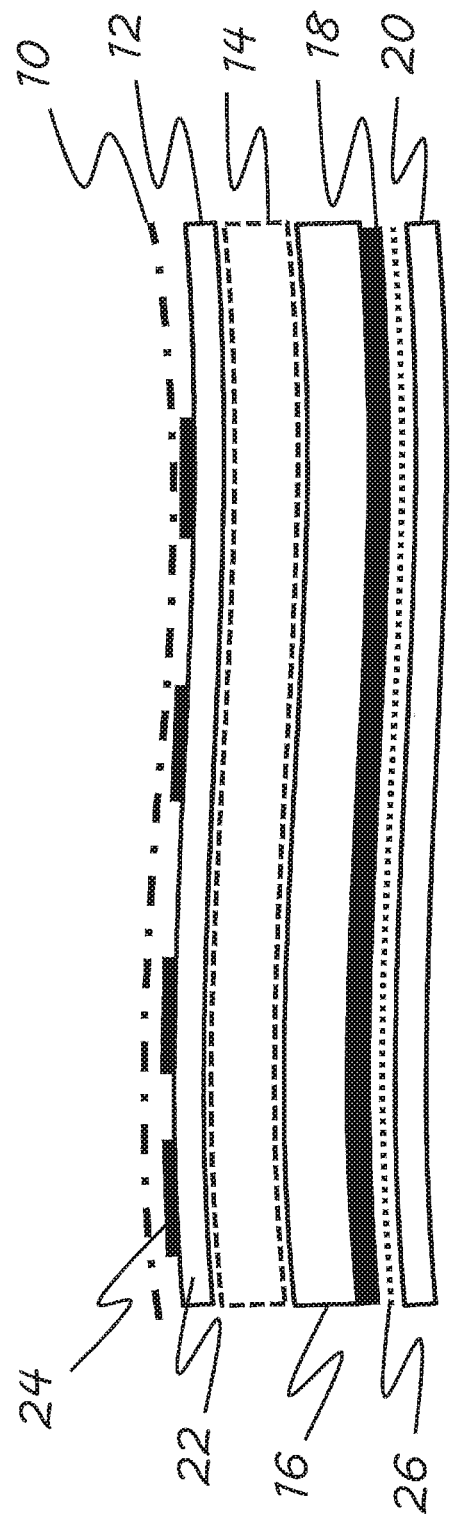
Fig. 3.A

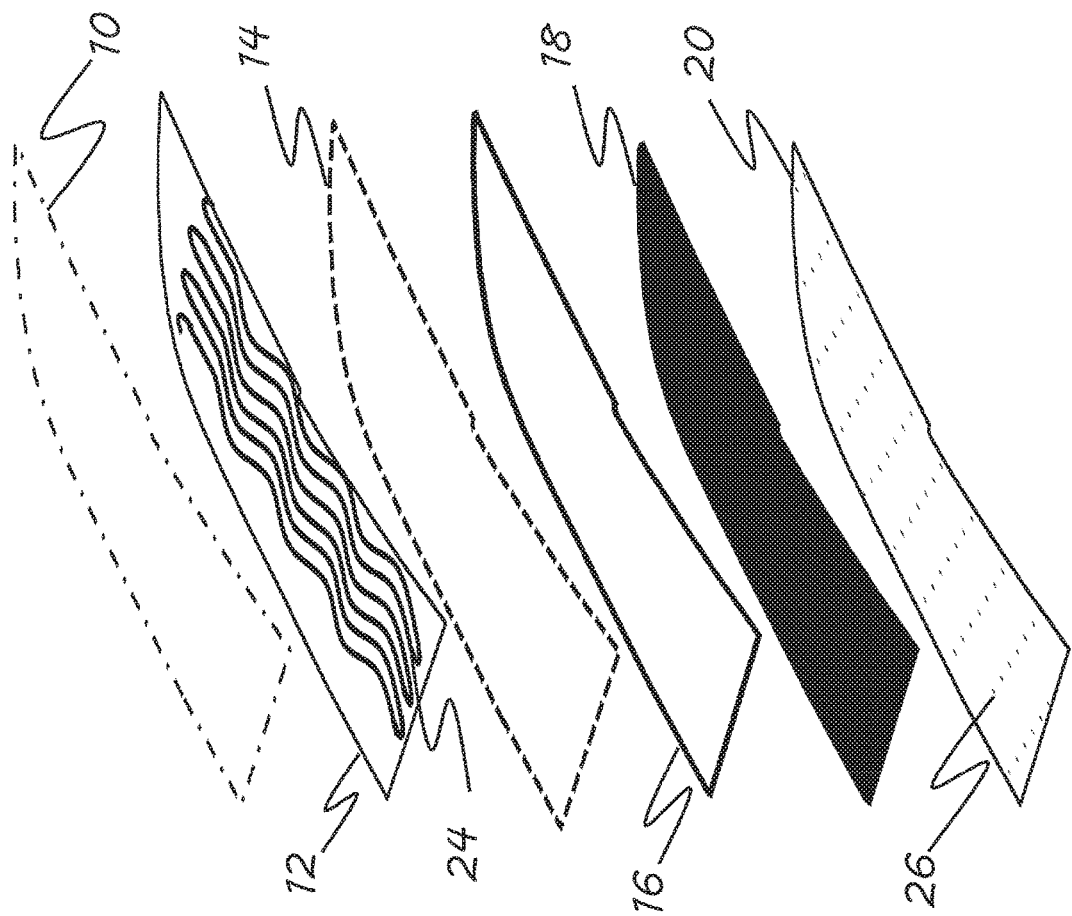
Fig. 3.B

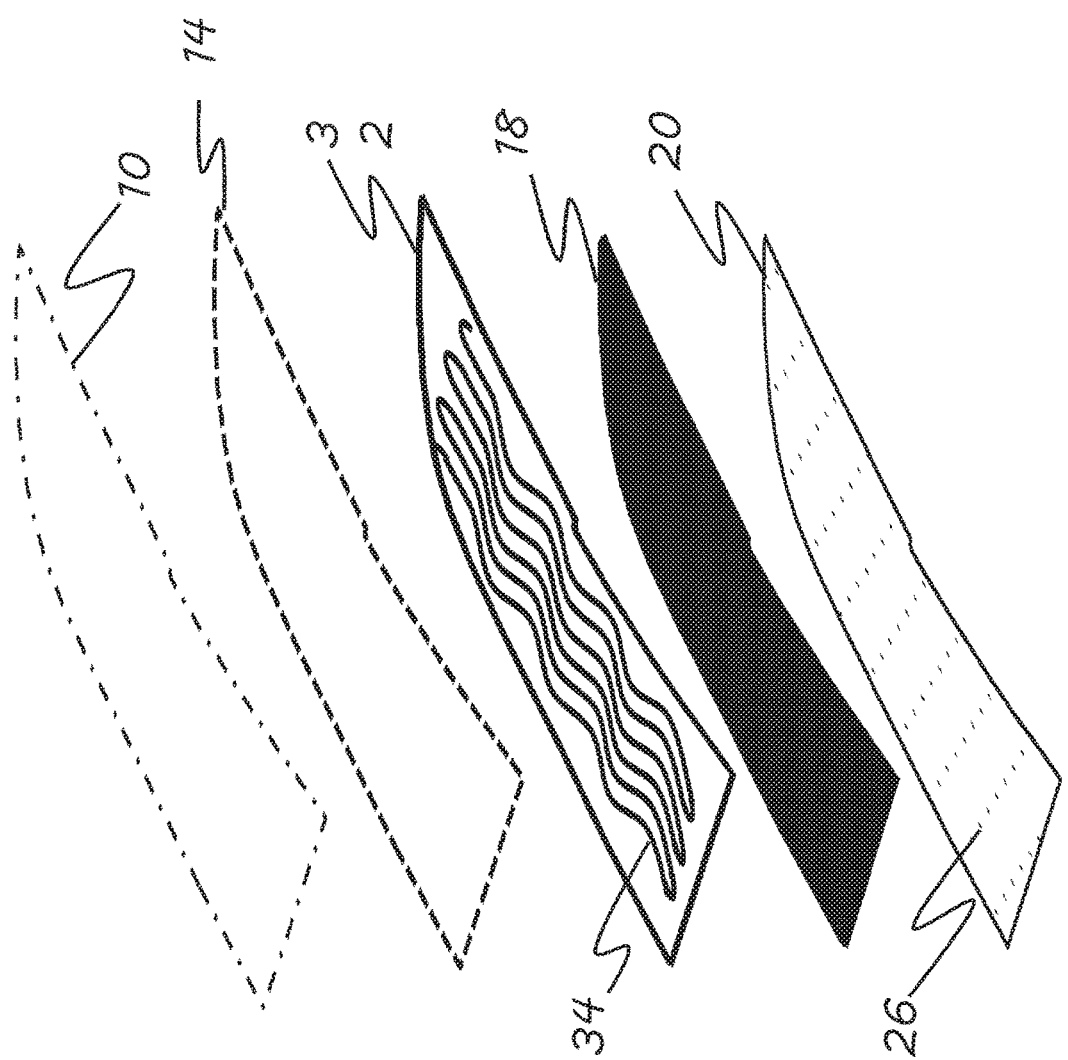
Fig. 5.A

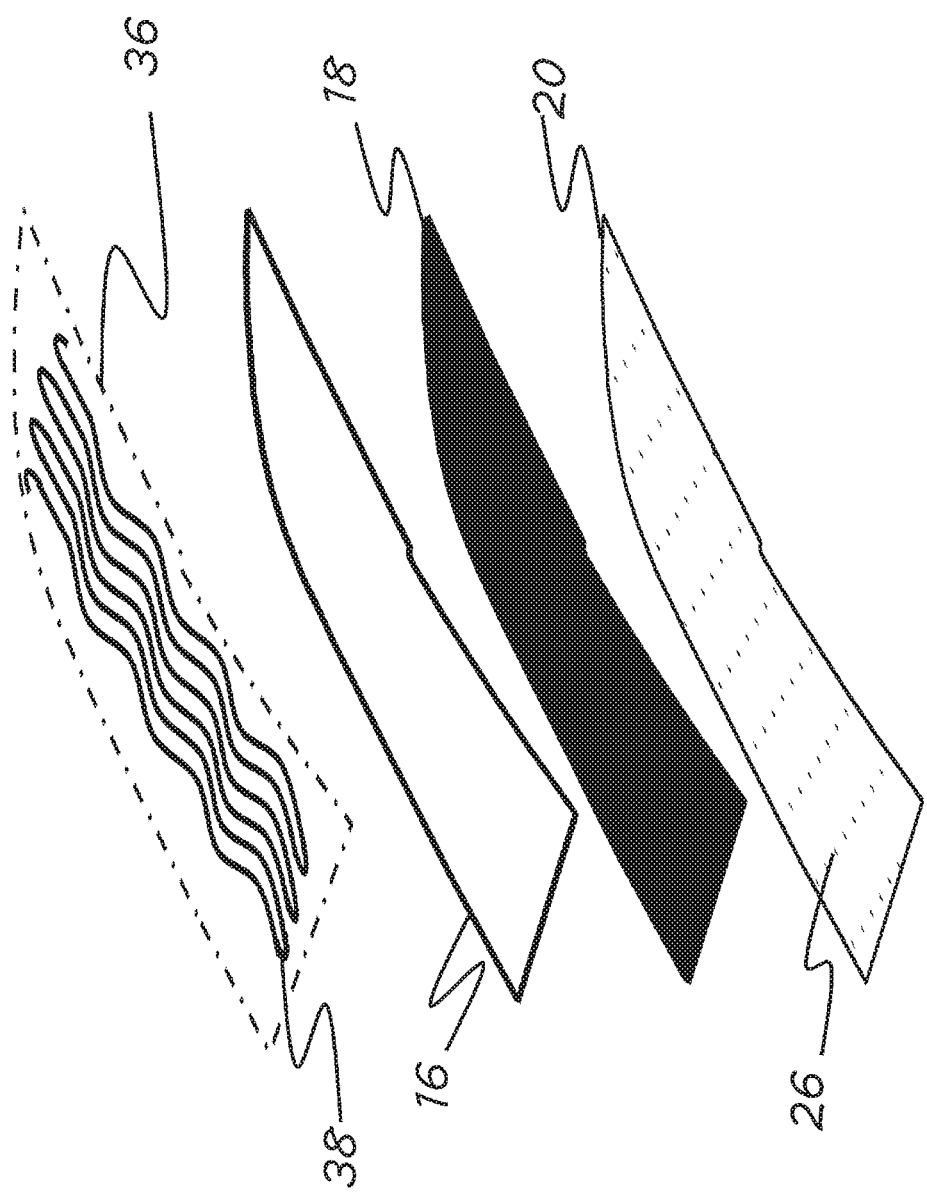
Fig. 6.A

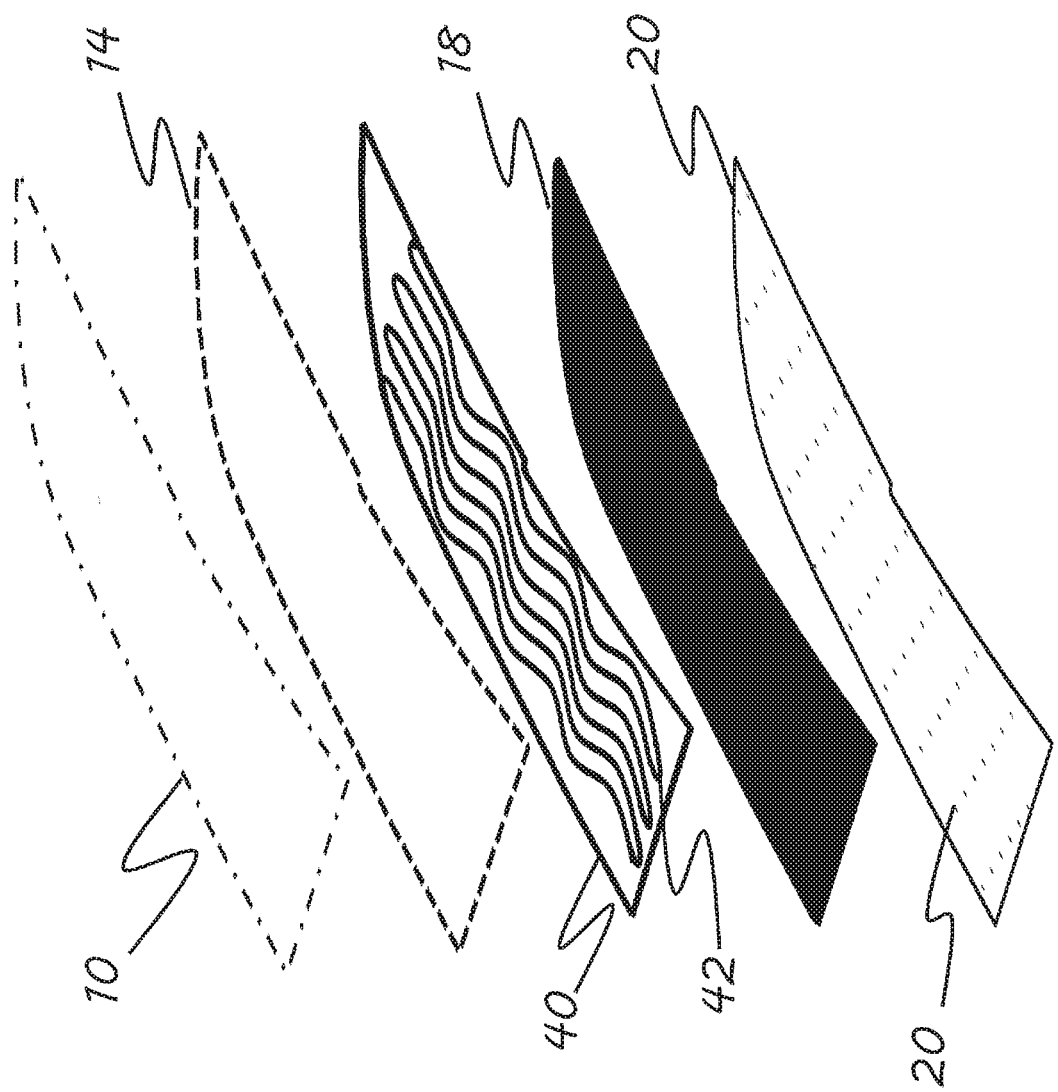
Fig. 7.A

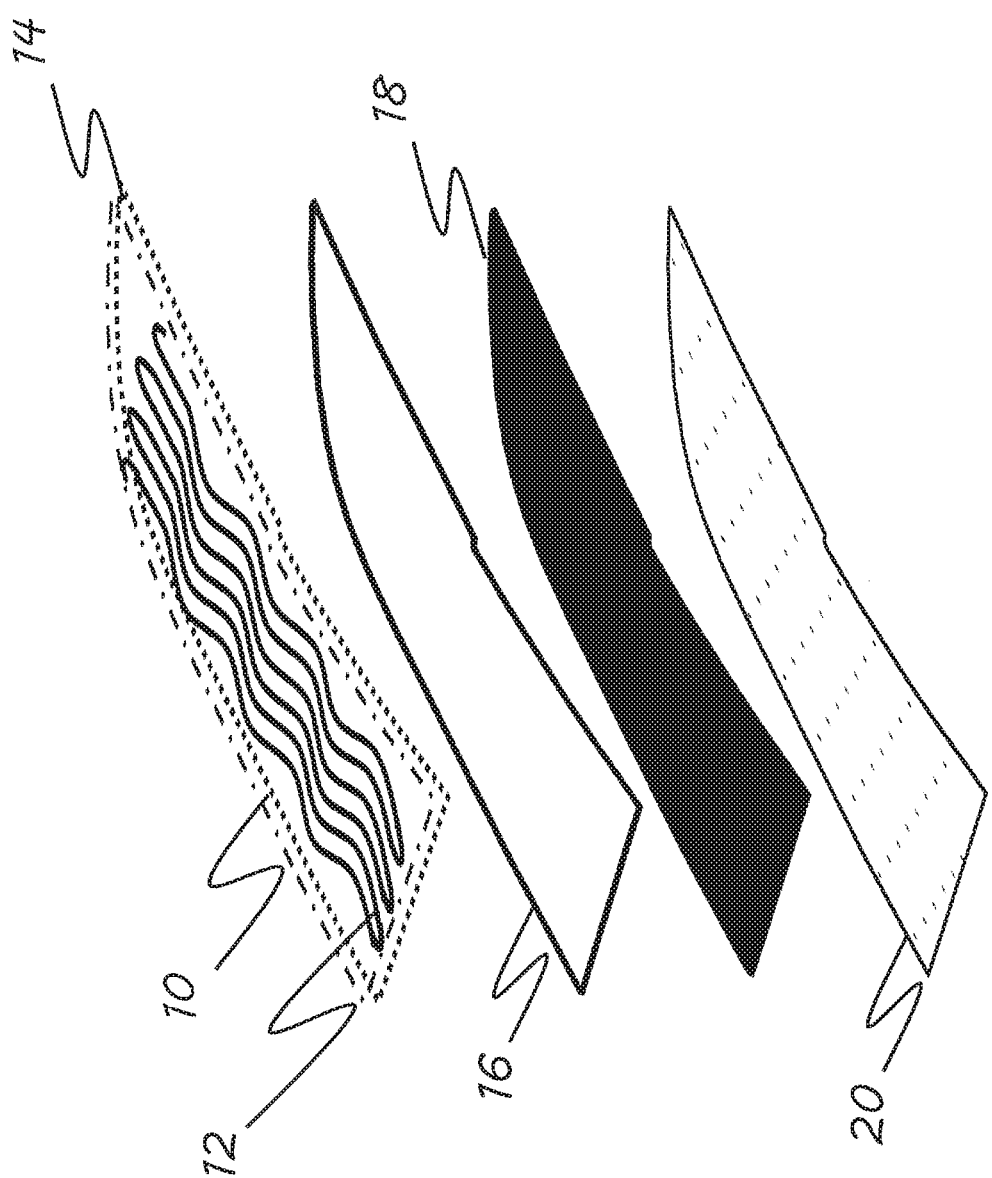
Fig. 8.A

TRIM PART

BACKGROUND

In the interior of motor vehicles, interior trim parts are employed which assume a multiplicity of tasks such as the sound insulation, providing a support for numerous display and function units, improving the aesthetic appearance and the like. Furthermore, a multiplicity of illumination and display units are found in the interior of a motor vehicle, which generally serve for either room illumination or background illumination, which illuminate individual objects for aesthetic reasons or for orientation, which indicate function states of the motor vehicle, serve as information or warning signal and much more. Increasingly, illumination and display units are found which are integrated in the interior trim.

DE 10 2008 045 015 A1 describes an interior trim part with electroluminescent elements, which are embedded flat in a moulded plastic skin of an instrument panel. The outermost layer of the electroluminescent element is produced from the same plastic material as the moulded skin.

EP 2 762 362 A1 describes an illuminated interior trim part for a motor vehicle with a light-emitting layer on the back of a support, wherein the support and its cover layer are translucent.

DE 10 2014 006 567 B4 describes an interior trim part with a back-lit component having a transparent diffusor element, a transparent cover layer on the diffusor element and a light source on the back of the diffusor element, the component sitting in or on a support layer and protruding from the same.

With the exception of the last mentioned publication, the illumination systems described above work according to a so-called "hidden until lit" technology. They can be configured so that they are not perceptible to the occupants of the motor vehicle while the associated light source is not switched on. In the switched-off state, the illumination device is concealed behind or in the interior trim part, it is preferably not perceptible, not even haptically, so that the interior trim part has an inconspicuous continuous appearance. The illumination device can serve both as background illumination and also for illuminating decorative elements and as orientation light. The known systems are limited to emitting light.

SUMMARY

The disclosure provides a trim part of a vehicle, which includes a translucent cover layer having a front surface and a back surface; a heating layer comprising a heating element that extends in a plane of the heating layer, the heating layer located on the back surface side of the cover layer; and a lighting module which is associated with the heating layer and adapted for lighting the heating layer so that at least part of the heating layer, more specifically at least part of its heating element is visible at the front surface side of the cover layer. The trim part does not hide the heating layer but uses the structure of the heating layer, more specifically of the heating element as a design element, graphic element, ornamental element, pattern or other decorative element of the trim part. The lighting module, which may comprise a lighting device tempered by the heating layer or a lighting device operating independently from the heating layer, is associated with the lighting module in such a way that the heating layer is illuminated by the lighting module.

Colour can influence a person's comfort and well-being. With a heated interior trim surface in combination with the lighted surface, virtually showing the heating circuitry at work, the vehicle's occupants will be more aware of the heat source and psychologically and physically more comfortable. Warm colours (such as red and amber) will enhance and convey a sensation of "warmth and heat". Whereas cool colours (such as blue and white) convey a sensation of "coolness and cold". Combining a heating element and lighting element within the same interior surface provides the means to enhance physical and psychological experiences.

The heating layer may comprise heating wires, circuitry or traces arranged in or on a substrate which are visible through the cover layer when the substrate is illuminated. In different examples, the substrate of the heating layer may be configured as a light guide to emit light towards the cover layer, it may transmit light from the back surface to front surface and towards the cover layer, or it may be reflective or may be combined with a reflective layer to reflect light which is directed to its front surface back towards the cover layer.

In different examples, the heating layer may comprise a polymer or glass substrate and the heating element may comprise a conductive line or conductive circuit applied to the substrate. For example, the substrate may be an organic polymer substrate, in particular a substrate including polyester or polyimide. The substrate further may be transparent or semi-transparent to allow visible light to pass through. The heating element may comprise a thin-film trace or, more generally, a circuit printed or otherwise applied on the substrate or a conductive film or polymer applied to or in the substrate, such as by 3D injection moulding (3d MID). In different examples, the heating element includes at least one of carbon, graphite, or conductive ink, conductive paste, conductive polymer or conductive thread or fiber. The heating layer may comprise a polymer or glass substrate and the heating element may comprise a resistive conductive circuit line applied to the substrate. The heating layer substrate may be flexible.

The heating circuit can be created within an image, pattern or picture with the option of utilizing generative model software. The process of creating the circuit design can range from a simple circuit to a complex planned or structured design process. A generative model is a model for generating all values for a phenomenon, both those that can be observed in the world and "target" variables that can only be computed from those observed. Alternatively, a discriminative model can be used, providing a model for the target variable(s), generating them by analysing the observed variables. In simple terms, discriminative models infer outputs based on inputs, while generative models generate both inputs and outputs, typically given some hidden parameters. Both may be used to generate and create a circuit within an pictorial image or pattern. This circuit may also include traces for sensors, such as proximity sensing, circuits for addressable RGB LEDs and more. For more complex designs, in particular, a designer may follow a systematic approach with intelligently guided computer generative simulation.

In one or more examples, the heating layer substrate may be an organic polymer substrate, in particular a substrate including polyester or polyimide.

In one or more examples, the heating layer substrate may be transparent or translucent to visible light.

In one or more examples, the heating element comprises a thin-film circuit trace printed, deposited, adhered or laser etched on the heating layer substrate or a wire or other conductive material applied to the substrate. The heating element, at least in parts thereof, is opaque.

In one or more examples, the heating element includes at least one of opaque carbon, graphite, or conductive ink or paste or a conductive film or foil.

In one or more examples, the heating element extends in the plane of the heating layer in a serpentine pattern, meandering pattern, zig zag pattern, S-shape, U-shape, W-shape, Ω-shape, in the shape of a graphic, pattern, writing or logo, or in another pattern extending across the surface of the heating layer, wherein the pattern or shape of the heating element is visible at the front surface side of the cover layer when the lighting module is emitting light.

In one or more examples, the lighting module comprises a light source and light feed connected to the heating layer for feeding, transmitting or projecting light into and/or through the transparent portion of the heating layer.

In one or more examples, the lighting module comprises a light emitting layer located on a side of the heating layer which faces away from the translucent cover layer.

In one or more examples, the lighting module comprises a light emitting layer located on a side of the heating layer which faces the translucent cover layer, and the heating layer comprises a reflective back layer.

In one or more examples, the light-emitting layer comprises an LED lighting module.

In one or more examples, the trim part further includes a close out cover layer located at a back surface of the trim part opposite to the front surface of the cover layer.

In one or more examples, the cover layer comprises a translucent foil, translucent textile, or perforated leather layer.

In one or more examples, the cover layer includes a 3-D spacer layer.

In one or more examples, the heating layer is applied directly to the back surface side of the cover layer.

In one or more examples, the trim part further includes a structural substrate layer wherein the heating layer is integrated with the structural substrate layer.

In one or more examples, the heating layer and the lighting module, in combination, are configured to provide both ambient heating across the surface of the trim part and ambient backlighting.

In one or more examples, the heating layer is configured to adjust an operating temperature of the lighting module.

In one or more examples, the lighting module is configured to emit light of different colours.

In the context of this application, different layers are described to be translucent. Translucency is intended to refer also to fully or semitransparent materials. Translucency implies that light may be at least partially transmitted and it may or may not be scattered. Further, certain materials, such as the substrate of the heater layer or intermediate layers, are described to be transparent. Transparency is intended to refer to fully or semitransparent materials wherein the degree of light transmittance generally is higher than for translucent materials. Further, there is little or no scattering of light in transparent materials.

In the context of this application, the characteristic "transparent" describes the optical characteristic of a material which will allow visible light to transmit through, with minimum absorption, at best 100% or almost 100%, for example 50% to 70%. The visible light, however, can be partially reflected and absorbed, as well as diffused and possibly manipulated or distorted by a transparent material. Examples for transparent material which can be used as substrates of the heating layer are transparent plastics, for example transparent PMMA, PC, PU, UV-stabilised ABS, PP or other transparent polymers and silicones, and glass. Examples of materials to be used as cover layer are translucent TPE/TPO, PVC, PU, or 3D Spacer Textile, Fabric (PES) or a Perforated Leather, Alcantara or Faux Leather. A "translucent" material has a certain light permeability such as for example in the case of frosted white milk glass, but the light can be at least partly diffused or absorbed through the material characteristics so that light and colours, bright and dark areas are perceptible but not all details of a display for example. "Semi-transparency" or "semi-transparent" is a reduced light permeability for example in the range from 10% to 70%, which may allow enough like to be visible, dependent on the light source. "Translucent" materials can be considered to be a sub-range of "transparent" materials or can partially overlap with "transparent" and "semi-transparent" materials.

BRIEF DESCRIPTION OF THE DRAWINGS

Examples are described with reference to a specific example shown in the drawings.

FIG. 2A to 2C show plan views of a trim part of FIG. 1, when mounted to a vehicle interior component, in three different lighting scenarios.

FIG. 3A shows an assembled sectional view of the trim part of FIG. 3.

FIG. 3B shows an exploded view of the trim part of FIG. 3.

FIG. 5A to 8A show associated exploded views of the trim part examples of FIGS. 5 to 8.

DETAILED DESCRIPTION OF THE INVENTION

With reference to the example, a trim part including its various layers is described. It is to be understood that the invention is not limited to the particular sequence of layers described, unless explicitly indicated. The front surface or front surface side of a layer refers to that surface/side of a respective layer which faces towards the visible face of the trim part when mounted in a vehicle, usually facing to the passenger compartment; and the back surface or back surface side of the layer refers to the opposite surface/side of the respective layer which faces away from the visible face, usually facing away from the passenger compartment.

Figure 1:
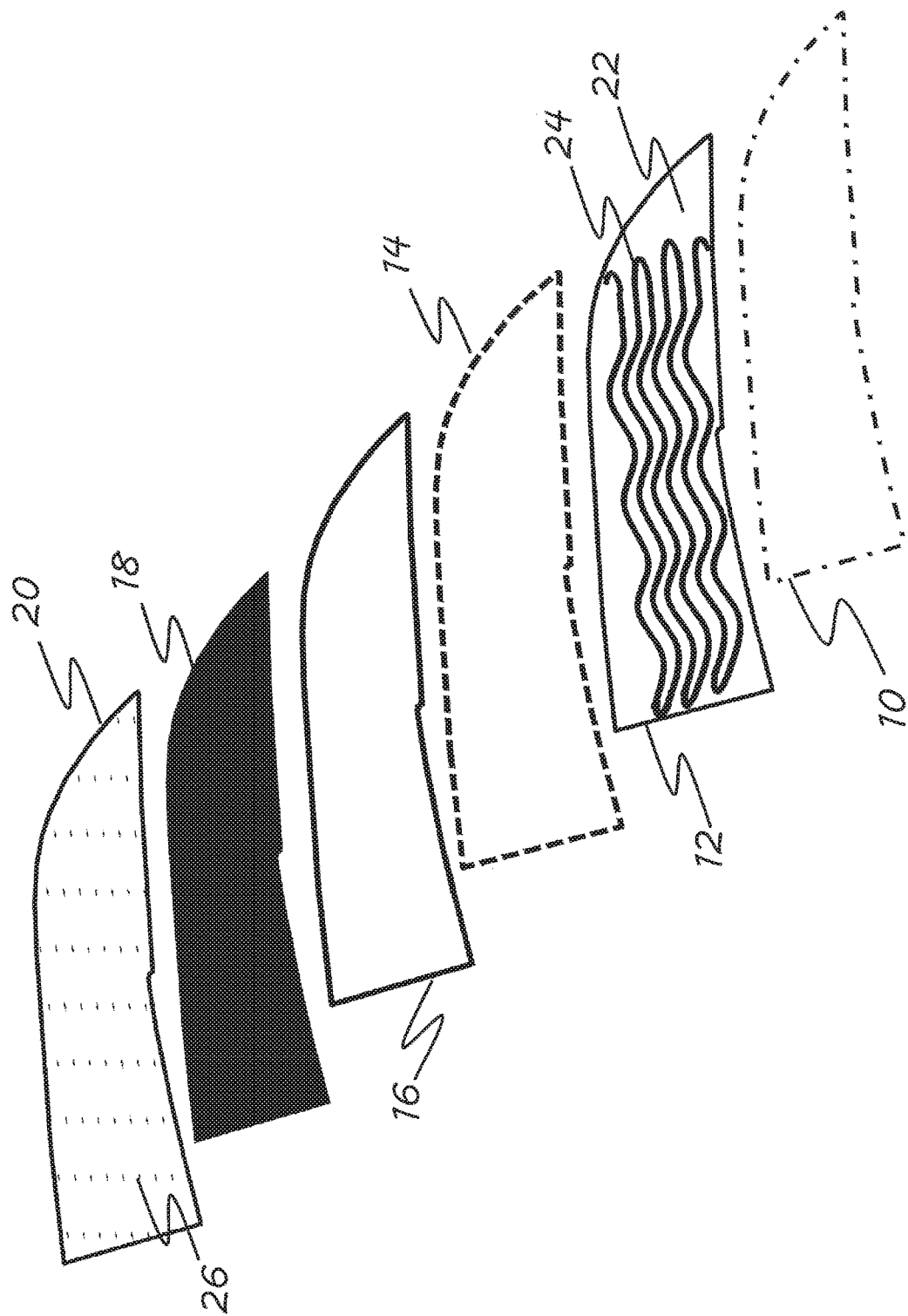
FIG. 1 is an exploded view of a trim part or "Module" according to an example.

In the example of FIG. 1, the various layers of the trim part are schematically shown in an exploded view. The trim part, in this example, comprises a cover layer or decorative material layer 10, a heating layer 12, a soft backing layer 14, such as a foam layer or spacer layer, a translucent rigid structural substrate layer 16, a lighting layer 18, and a close out layer 20. Layers 14, 16, and 20 are optional. Lighting layer 18 could be substituted by another type of lighting module. Also the sequence of layers is not limited to the sequence shown in FIG. 1. For example, backing layer 14 could be provided between the heating layer 12 and the cover layer 10. Lighting layer 18 could be placed between substrate layer 16 and heating layer 12. Lighting layer 18 also could be integrated with substrate layer 16 or with the heating layer 12, etc.

The cover layer 10 can be produced from a plastic such as PU, PVC, TPU, TPE or TPO, of a textile, 3D Spacer, leather or artificial leather or a composite material such as is known in principal for interior trim parts. The cover layer also 10 may be produced as a slush skin. A slush skin is a plastic skin for example on PVC basis or urethane basis (TPU) or olefin (TPO) or polyester base (TPE), which is formed by melt plastic powder on a heated mould (nickel shell). The mentioned materials merely serve as examples and are not intended to imply any limitation to certain materials. A soft backing layer may be provided adjacent to the backside of the cover layer, such as a foam layer or spacing layer, as part of the cover layer 10 or separate therefrom, to provide a haptically soft touch of the trim part.

The heating layer 12 may include an organic polymer substrate 22, with a resistive heating trace or circuit 24 on or within the substrate. The resistive heating trace may, for example, be printed on the transparent flexible substrate (PES, FR4 or similar) or may be integrated within the substrate during its production, such as by injection moulding or 3D MID. The resistive heating trace or circuit may be made from or comprise a conductive metal, carbon, graphite, or conductive ink, conductive paste or conductive polymer. The heating trace also may comprise a wire. The heating trace or circuit 24 is opaque and in addition to its electronic heating function is decorative in the visual shape and form of a graphic, pattern, logo, writing, image or symbol or another decorative element.

In the example shown in FIG. 1, the heating trace or circuit 24 is arranged in the shape of a continuous circuitry meandering line which extends across a substantial part of the plane of the heating layer 12 to provide a uniformly heated surface of the heating layer 12. Other shapes and more than one heating trace or circuit may be provided. This circuit may include additional functions, such as a proximity sensor that may be used to turn on and off the heating element or light or change the colour of the light. In addition the "sensor" within the designed decorative circuit may provide and serve other functions.

The soft backing layer 14 is optional and may be provided at the front surface or at the back surface side of the heating layer 12. It may include a foam layer, transparent silicone gel or spacer layer that allows the light to pass thru. It may be provided as an alternative or in addition to a soft backing layer of the cover layer 10. The soft backing layer 14 helps providing a haptically soft touch of the trim part.

The translucent substrate layer 16 is rigid and structural and provides a stabilizing layer. It also may be configured to provide an optical effect, such as light diffusion, light scattering, light deflection and the like. The substrate layer may be made from or include transparent plastics, for example transparent PMMA, PC, PU, UV-stabilised ABS, PP or other transparent polymers and silicones, and glass.

The lighting layer 18, in the example shown, may be a backlight source LED layer or an LCD layer, generally known in the art. The lighting layer 18 provides a lighting module, which may use all types of light sources, OLED lamp, PMMA, polymeric optical fibre (POF) Textile with LEDs, a "lightbox" enclosure with LEDs, a poly-optical light film or foil, i.e. a microstructured films having optical features, with SMD LEDs, LED array or matrix, or an electroluminescence film (EL) or light pipe in combination with an LED or a cluster of LEDs. The lighting layer 18 also may comprise a display layer, such as known for LED or LCD displays, segment displays, or even LCD TIFF touch screens, static and dynamic displays. The lighting layer 18 may be configured to emit light of different colour, including different colours in different areas of the lighting layer and/or dynamically changing colours, still images and moving images, video and the like.

In an alternative configuration, the lighting layer may be provided between the heating layer 12 and the cover layer 10. In this configuration, the heating layer 12 can be associated with a reflective layer to reflect light emitted from the lighting layer towards the cover layer 10.

Instead of providing a separate lighting layer, it also is possible to configure the heating layer based on a substrate 20 having a light guiding property and coupling light into the substrate 20 of the heating layer 12 from a light source (not shown) to illuminate directly the heating layer and its heating function. The heating layer then will also operate as part of the lighting module.

The closeout layer 20 may be made from a substrate and provides a preferably opaque back surface of the trim part for light management. The close out layer 20, on its front surface, may be provided with a reflective layer to enhance light emission from the lighting layer 18. The close out layer 20 also may provide thermal insulation to prevent thermal bridging from the heating layer 12 to the backside of the trim part. The substrate of the close out layer 20 may be formed from a thermoplastic or duroplastic polymer, including PET, MMA, PC, PU, ABS, and PP, or from a composite fibre material, including synthetic and natural fibres.

The individual layers 12-20 of the trim part are assembled together by various methods including, mechanical fasteners, heatstaking or vibration welding or lamination or by bonding with aliphatic adhesives to provide a sandwich configuration. In general, lamination can be performed by the application of heat, pressure and/or adhesive.

The lighting layer 18 and the heating layer 12 are provided with suitable terminals, cables and connectors (not shown) to supply electrical and/or optical signals and control the lighting and heating functionality.

Operation and control of the lighting layer 18 and the heating layer 12 can be adapted in such a way that the heating layer provides heat as needed and when required. And the lighting layer may provide different colour light for signalling and communicating the operating state of the heating layer. Just as one example, the lighting layer 18 can be controlled to emit red light when the heating layer is active and to emit blue light or light of any colour when the heating layer is inactive.

FIG. 2A to 2C show three different views of the trim part of FIG. 1, when mounted to a vehicle interior component, in three different lighting scenarios. In this example, the trim part 28 is an insert in an interior lining of a vehicle door 30. FIG. 2A shows the trim part 28 with the lighting module deactivated so that only the front surface of the cover layer 10 is visible. FIG. 2B shows the trim part 28 with the lighting module emitting a bright colour light, such as blue light or white light so that the lightened heating layer 12 is visible through the cover layer, with the opaque heating circuit trace 24 locally blocking the light so that it may be perceived optically as forming a pattern. FIG. 2C shows the trim part 28 with the lighting module emitting a darker colour light, such as red light so that the lightened heating layer 12 is visible through the cover layer, with the opaque heating circuit trace 24 locally blocking the light so that it may be perceived optically as forming a pattern.

The trim part provides a so-called "hidden until lit" effect wherein the pattern provided by the opaque resistive trace of the heating layer is not perceptible to the occupants of the motor vehicle when the associated lighting module is deactivated. In this state, the heating layer is concealed behind the cover layer. When the lighting module is activated, the trim part can serve as background illumination, as orientation light and for illuminating the pattern provided by the heating trace or circuit as a decorative element.

Figure 3:
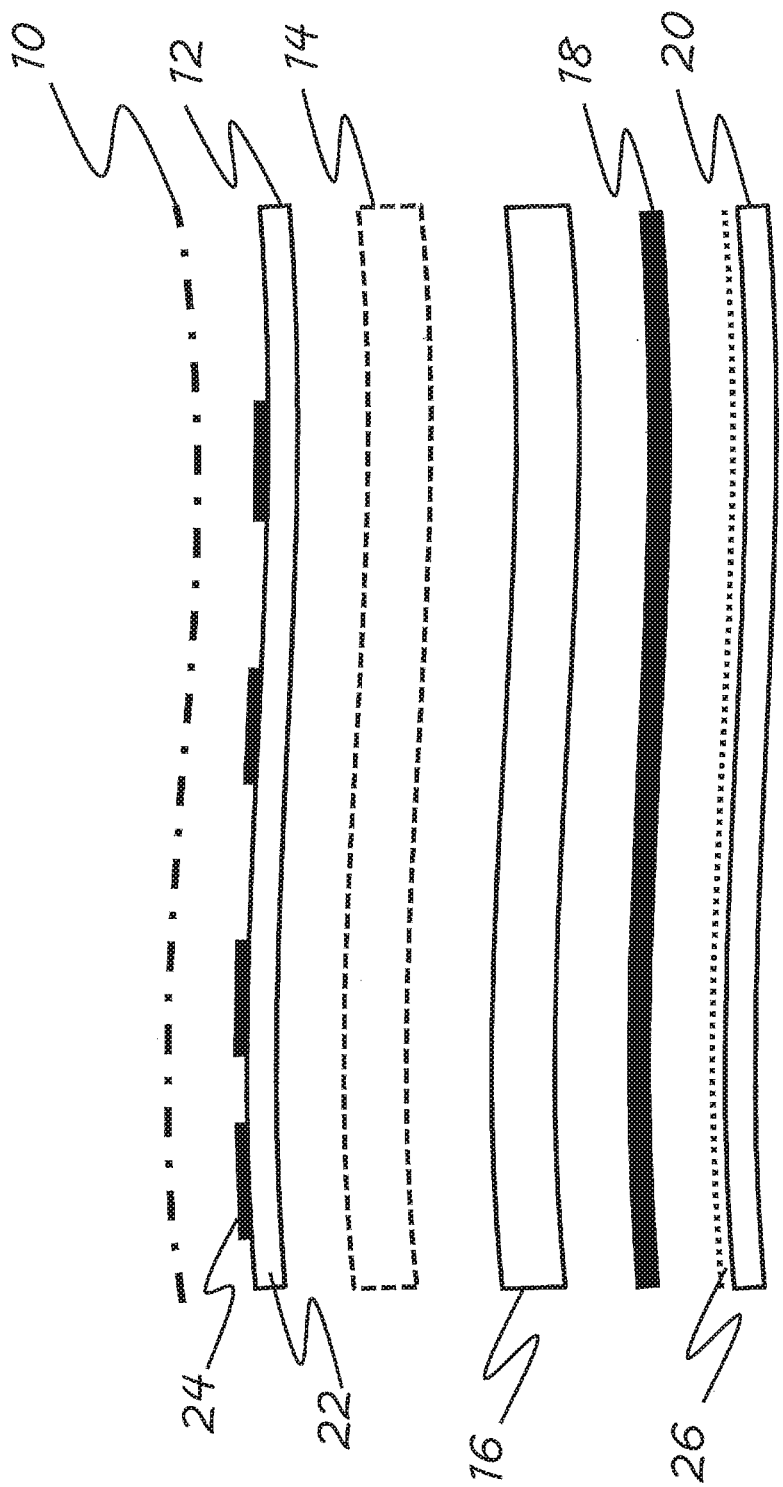
FIG. 3 shows a schematic exploded sectional view of the trim part of FIG. 1.

FIGS. 3, 3A and 3B show schematic views of the trim part example of FIG. 1, including the cover layer or decorative material layer 10, the heating layer 12, the soft backing layer 14, such as a foam layer or spacer layer, the translucent rigid structural substrate layer 16, the lighting layer 18, and the close out layer 20. The heating layer 12 is shown to include a transparent heating layer substrate 22 and an opaque heating circuit 24 applied to the heating layer substrate 22. The lighting layer 18 emits and transmits light through the substrate layer 16, backing layer 14, heating layer 12 and cover material layer 10 wherein part of the light is blocked by the opaque heating circuit so that the structure of the heating circuit may be optically perceived at the front surface of the trim part. Additionally, a reflective material layer 26 may be provided on the front side of the close out 20. The reflective material layer 26 may be provided as a reflective coating or film or sheet on the close out 20 or between the closeout 20 and the lighting element. It can enhance and/or direct the light emitted from the lighting layer 18 and direct any stray light back to and through the heating layer 12 and to the front of the trim part.

Figure 4:
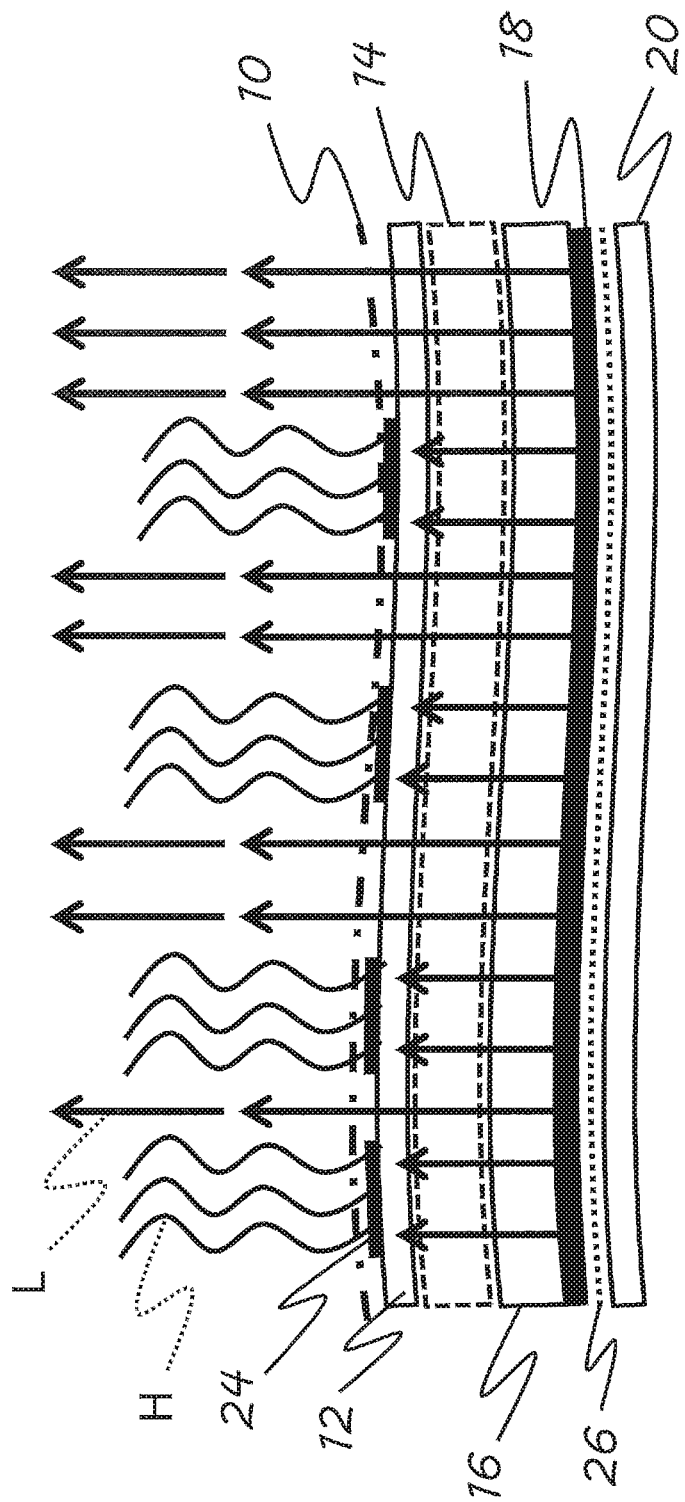
FIG. 4 shows a similar sectional view of the trim part of FIG. 1, illustrating an operational state.

FIG. 4 illustrates the same trim part when assembled and when the heating circuit 24 is emitting heat H and the lighting layer 18 is emitting light L. For the sake of clarity some of the reference numbers have been omitted. The drawing illustrates how heat, H, is radiating from the front surface of the trim part and how light, L, exits and can be perceived at the trim part front surface in sections located between the traces of the heating circuit 24. In the sections of the heating circuit traces 24, light emitted from the lighting layer 18 is blocked, as indicated by L'. In these sections, the trim part will be perceived as non-lit or dark whereas in the sections between the heating circuit traces the trim part will be perceived as lit or bright or coloured. Accordingly, the circuit shape of the heating layer can be used to generate a "hidden until lit" image on the front surface of the trim part. Moreover, the colour of light emitted from the lighting layer 18 can be controlled to match the heating status and can be changed dynamically. For further details and variants, including operation of the trim part, reference is made to the description of FIG. 1 above.

Figure 5:
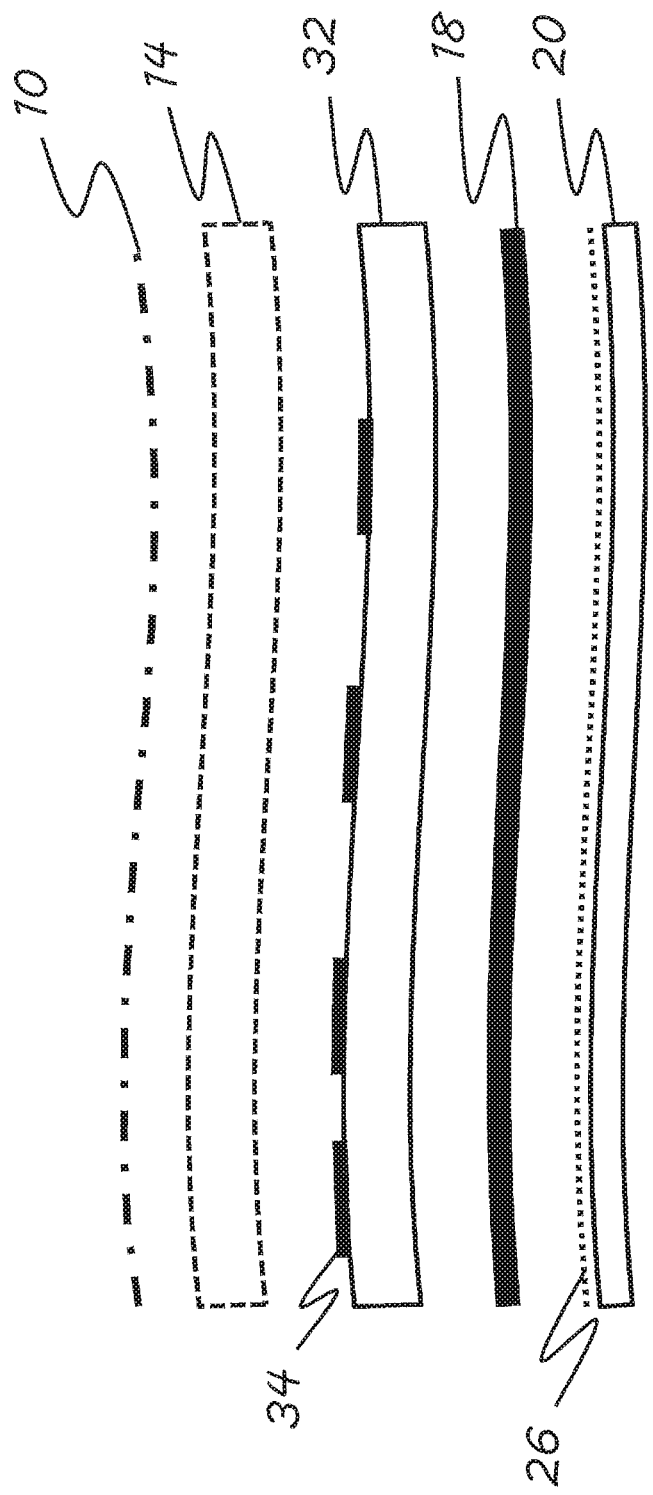
FIGS. 5 to 8 show schematic exploded sectional views of further examples of the trim part.

FIGS. 5 and 5A shows schematic views of a trim part according to a further example, this example also including the cover layer or decorative material layer 10, the soft backing layer 14, such as a foam layer or spacer layer, the lighting layer 18, and the close out layer 20. In this example, the heating layer is integrated in a translucent rigid structural substrate layer 32 carrying opaque heating circuit traces 34 and is arranged between the lighting layer 18 and the backing material layer 14. The heating circuit traces 34 can be applied to the substrate 32 in any suitable manner, such as described above with respect the heating layer substrate 22 and the heating circuit traces 24. Some examples for applying the circuit traces 24 to the substrate are by printing using a conductive fluid, or the application of a patterned conductive foil or film. It also is possible to apply a conductive wire pattern onto the back or front surface of the substrate layer 32 or integrate such a structure into the substrate layer. For further details and variants, including operation of the trim part, reference is made to the description of FIG. 1 above.

Figure 6:
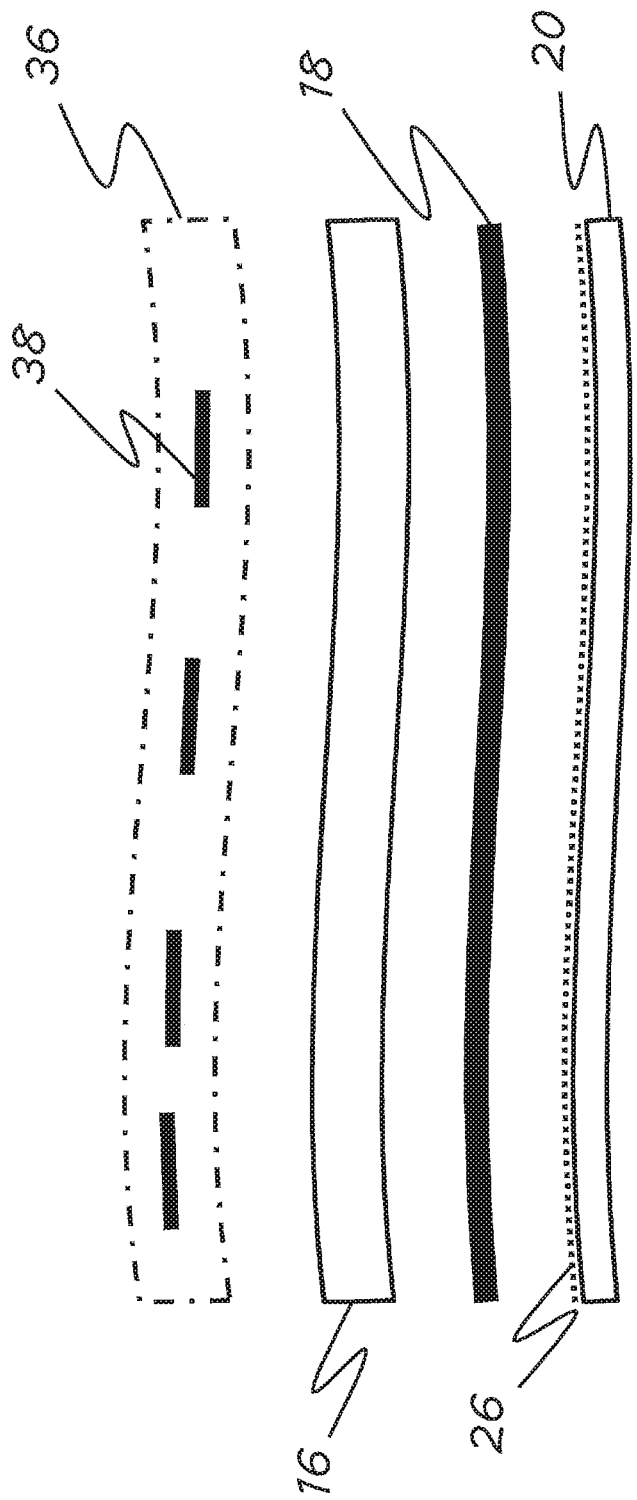

FIGS. 6 and 6A show schematic views of a trim part according to a further example, this example also including a cover layer or decorative material layer 36, the translucent structural substrate 16, the lighting layer 18, and the close out layer 20. In this example, the heating layer is integrated in the cover layer 36 carrying opaque heating circuit traces 38 with in the layer. The cover layer 36 of this example is a relatively thick surface material which may include a spacer layer of foam layer. The heating circuit traces 38 can be integrated into the cover layer 36 or applied to the back or front of the cover layer 36 in any suitable manner, such as by in-moulding, printing a foil or film using a conductive fluid, or the application of a patterned conductive foil or film, which may be embedded in the cover layer 36. It also is possible to integrate a conductive wire pattern with in the cover layer 36 or apply a conductive wire pattern onto the back surface of the cover layer 36. For further details and variants, including operation of the trim part, reference is made to the description of FIG. 1 above.

A trim part similar to the one described with reference to FIG. 6 can be made using a thin film or foil, such as a slush skin, as a cover material layer, instead of the thicker surface material layer 36.

Figure 7:
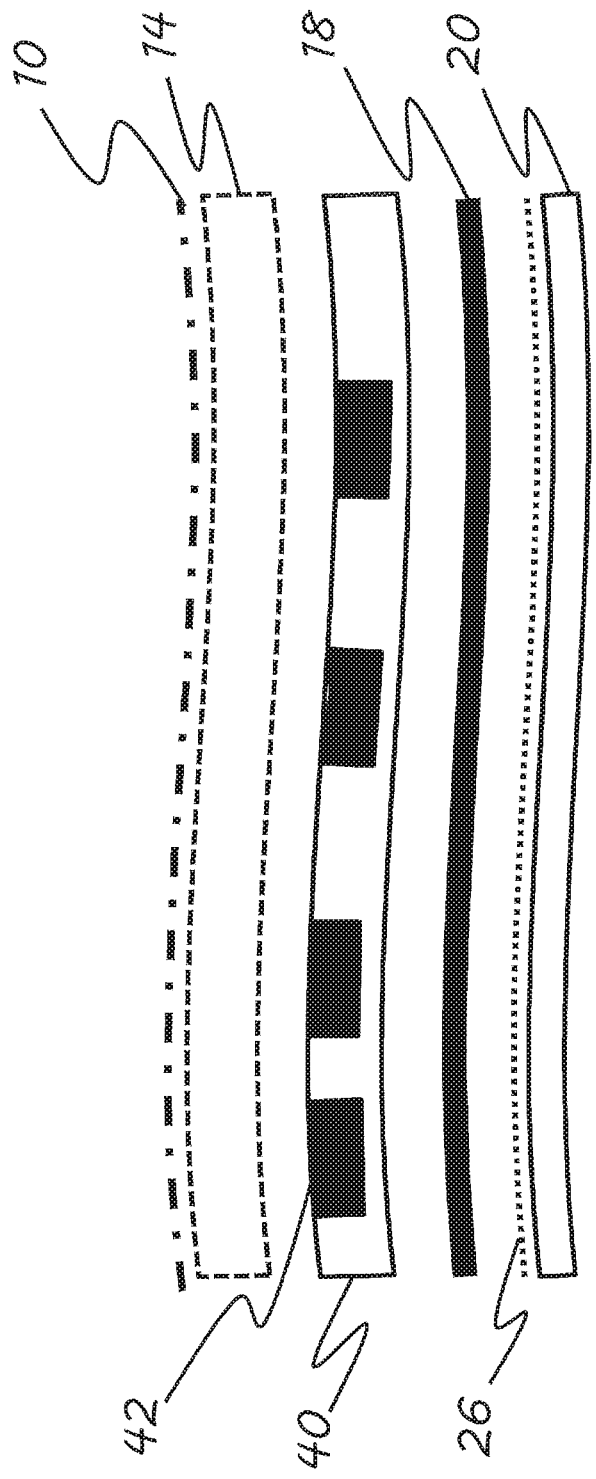

A further variant of a trim part is schematically shown in FIGS. 7 and 7A. This variant is similar to 3o the example of FIG. 5, except that the heating layer and the structural substrate are integrated in such a way that conductive circuit traces 42 are embedded in a rigid substrate 40. This can be done by 3D MID injection moulding, for example. For example, circuit traces provided in the form of a patterned foil or film or as a patterned wire may be introduced into a mould and the mould may be closed for forming the substrate by injection moulding or foaming around the circuit traces. In another example, circuit traces may be applied to a transparent foil or film, to provide a heating layer, which is then inserted into a mould and the substrate may be formed by back-injection or foaming the substrate material onto a back surface side of the heating layer.

Figure 8:
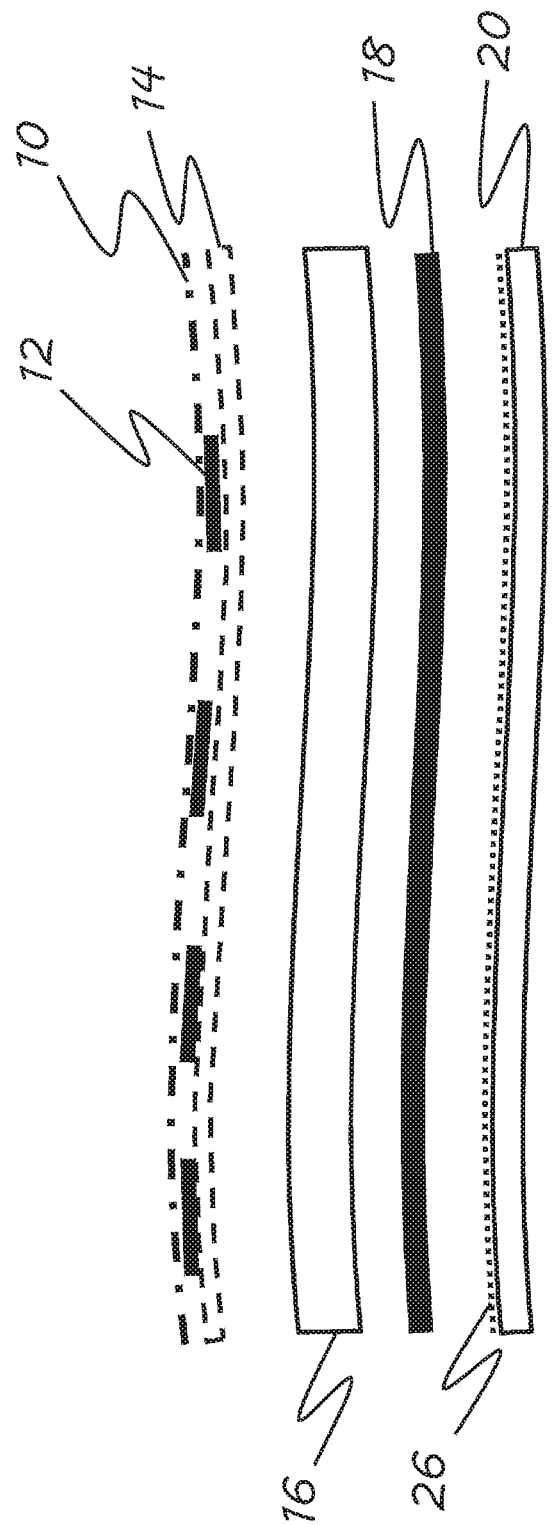

A further variant of a trim part is schematically shown in FIGS. 8 and 8A. This variant is similar to the example of FIG. 6, except that the heating layer 12 is printed directly onto the A side or B side of the cover material 10 which is laminated with backing layer 14. The cover layer may be a TPO/TPE or PVC foil, for example. The backing layer 14 can be a translucent spacer layer, translucent foam layer, translucent scrim textile or the like. The backing layer may be laminated to the cover layer or may be back foamed, for example.

In the above description, the same reference numbers are used for corresponding features throughout the drawings. These features are not described in detail in the description of each one of the drawings to avoid fastidious repetitions. However, where details of certain features are not provided, reference is made to the description of the respective preceding drawings. It is to be understood that any variants and details of one example may also be applied to the other examples.

The invention claimed is:

1. A part of a vehicle, including
   a translucent cover layer having a front surface and a back surface;
   a heating layer comprising a heating element extending in a plane of the heating layer, the heating layer located on the back surface of the cover layer;

a lighting module associated with the heating layer and adapted for lighting the heating layer so that at least part of the heating layer is visible at the front surface of the cover layer.

2. The trim part of claim 1 wherein the heating layer is at least in part transparent or translucent and comprises at least one local opaque region.

3. The trim part according to claim 1, wherein the heating layer comprises a polymer or glass substrate and the heating element comprises a resistive conductive circuit line applied to the substrate.

4. The trim part of claim 3 wherein the heating layer substrate is flexible.

5. The trim part according to claim 3, wherein the heating layer substrate is an organic polymer substrate.

6. The trim part according to claim 3, wherein the heating layer substrate is transparent or translucent to visible light.

7. The trim part according to claim 3, wherein the heating element comprises a thin-film circuit trace printed, deposited, adhered or laser etched on the heating layer substrate or a wire or other conductive material applied to the substrate.

8. The trim part according to claim 1 wherein the heating element, at least in parts thereof, is opaque.

9. The trim part according to claim 2 wherein the heating element includes at least one of opaque carbon, graphite, or conductive ink or paste or a conductive film or foil.

10. The trim part according to claim 2 wherein the heating element extends in the plane of the heating layer in a serpentine pattern, meandering pattern, zig zag pattern, S-shape, U-shape, W-shape, Ω-shape, in the shape of a graphic, pattern, writing or logo, or in another pattern extending across the surface of the heating layer, wherein the pattern or shape of the heating element is visible at the front surface of the cover layer when the lighting module is emitting light.

11. The trim part according to claim 2, wherein the lighting module comprises a light source and light feed connected to the heating layer for feeding, transmitting or projecting light into and/or through the transparent-portion of the heating layer.

12. The trim part according to claim 2, wherein the lighting module comprises a light emitting layer located on a side of the heating layer which faces away from the translucent cover layer.

13. The trim part according to claim 2, wherein the lighting module comprises a light emitting layer located on a side of the heating layer which faces the translucent cover layer, and the heating layer comprises a reflective back layer.

14. The trim part according to claim 9, wherein the light-emitting layer comprises an LED lighting module.

15. The trim part according to claim 1, further including a close out cover layer located at a back surface of the trim part opposite to the front surface of the cover layer.

16. The trim part according to claim 1, wherein the cover layer comprises a translucent foil, translucent textile, or perforated leather layer.

17. The trim part according to claim 1, wherein the cover layer includes a 3-D spacer layer.

18. The trim part according to claim 1, wherein the heating layer is applied directly to the back surface of the cover layer.

19. The trim part according to claim 1, further including a structural substrate layer wherein the heating layer is integrated with the structural substrate layer.

20. The trim part according to claim 1, wherein the heating layer and the lighting module, in combination, are configured to provide both ambient heating across the surface of the trim part and ambient backlighting.

* * * * *